United States Patent
Wang

(10) Patent No.: US 9,677,598 B2
(45) Date of Patent: Jun. 13, 2017

(54) PAD STRUCTURE OF SUCKING DISC

(71) Applicant: SAN HAO RUBBER COMPANY LTD., Taichung (TW)

(72) Inventor: Huan Wang, Taichung (TW)

(73) Assignee: San Hao Rubber Company Ltd., Taichung (TW)

( * ) Notice: Subject to any disclaimer, the term of this patent is extended or adjusted under 35 U.S.C. 154(b) by 0 days.

(21) Appl. No.: 15/051,028

(22) Filed: Feb. 23, 2016

(65) Prior Publication Data

US 2016/0169269 A1 Jun. 16, 2016

Related U.S. Application Data

(63) Continuation-in-part of application No. 14/464,801, filed on Aug. 21, 2014, now abandoned.

(51) Int. Cl.
- *A45D 42/14* (2006.01)
- *F16B 47/00* (2006.01)
- *F16M 13/02* (2006.01)

(52) U.S. Cl.
CPC ........... *F16B 47/00* (2013.01); *F16M 13/022* (2013.01); *F16B 47/006* (2013.01)

(58) Field of Classification Search
CPC ................. F16B 47/00; F16B 47/066
IPC ....................................... F16B 47/00
See application file for complete search history.

(56) References Cited

U.S. PATENT DOCUMENTS

| | | | | |
|---|---|---|---|---|
| 8,876,072 B2* | 11/2014 | Hsu | ......................... | F16B 47/00 248/205.5 |
| 9,494,184 B1* | 11/2016 | Lee | ......................... | F16B 47/00 |
| 2002/0175250 A1* | 11/2002 | Lian | ......................... | F16B 47/00 248/205.5 |
| 2007/0023594 A1* | 2/2007 | Choi | ......................... | F16B 47/00 248/205.5 |

* cited by examiner

*Primary Examiner* — Amy Sterling
(74) *Attorney, Agent, or Firm* — Rosenberg, Klein & Lee

(57) ABSTRACT

A pad structure includes a main body made of soft material. The main body has an axial surface, a suction surface, and a peripheral surface. The axial surface is provided for being pressed by a pressing member of the sucking disc. The suction surface is provided for sucking on a target object. The axial surface includes a lifting portion and a pressure bearing block. The pressure bearing block is hard and circular shaped. The portion of the main body between the lifting portion and the pressure bearing block is defined as a deformable portion. The portion of the main body below the pressure bearing block is defined as an undeformable portion. The undeformable portion is located at the outer periphery of the main body. The deformable portion is located between the lifting portion and the undeformable portion.

7 Claims, 7 Drawing Sheets

PAD STRUCTURE OF SUCKING DISC

REFERENCE TO RELATED APPLICATIONS

This Application is being filed as a Continuation-in-Part Application of Ser. No. 14/464,801, filed 21 Aug. 2014, currently pending.

BACKGROUND OF THE INVENTION

Field of the Invention

The present invention relates to a sucking disc, in particular to a pad structure of the sucking disc.

Description of the Prior Art

In general, as shown in FIG. 6, a conventional sucking disc structure has a soft pad 80 commonly made of rubber, and the center of the pad 80 has a lifting portion 81, and a pressing member 82 is assembled above the pad 80. To use the sucking disc, firstly the pad 80 is attached onto a wall 9, and a control member 83 of the sucking disc is provided for controlling the pressing member 82 to press onto the pad 80. Next, the lifting portion 81 is lifted upward, so that the center position of the pad 80 is lifted upward. Since the pad 80 is already pressed onto the wall 9 and defines an airtight condition with the wall 9, when the lifting portion 81 is lifted upward, the pad 80 defines a vacuum space 84 with the wall 9, so that a strong suction is provided to fix the sucking disc onto the wall 9.

However, if air enters into the vacuum space 84, the suction will disappear since the vacuum condition is destroyed, and the sucking disc no longer has the effect of being fixed onto the wall 9. Therefore, the pressing ability of the pressing member 82 of the sucking disc to the pad 80 is very important. Because the pad 80 is made of soft material having the ability of being elastically deformed, when the pressing member 82 is controlled to press onto the pad 80 and to lift the lifting portion 81 upward, the force of the pressing member 82 applied to the pad 80 is still insufficient to resist against the deformation of the pad 80, and the periphery of the pad 80 would shift toward the center portion.

In addition, because the pressing member 82 is generally a thin casing, the area of the pad 80 to be pressed by the pressing member 82 is too small. On the other hand, as shown in FIG. 7, the top portion of the pad 80 is pressed by the pressing member 82 and deforms slightly, while the inner portion of the pad 80 is deformed apparently because its relative soft texture, and the farther distance the portion of the pad 80 is away from the top portion of the pad 80, the higher degree of deformation the portion of the pad 80 has. Consequently, the bottom portion of the pad 80 deforms significantly, the contact area between the pad 80 and the wall 9 is very small, and external air would enter into the vacuum space 84 to destroy the vacuum condition easily, so that the suction of the sucking disc would be failed.

The present invention is, therefore, arisen to obviate or at least mitigate the above mentioned disadvantages.

SUMMARY OF THE INVENTION

One object of the present invention is to provide a pad structure of a sucking disc having a circular pressure bearing block integrally formed with the pad structure and provided for being pressed by a pressing member of the sucking disc. Accordingly, because the pressing force is uniformly applied over the whole pressure bearing block, the portion of the pad structure pressed by the pressing member is not deformed, and the pad structure can improve the airtight ability for the sucking disc.

To achieve the above and other objects, a pad structure is provided and comprises a main body made of soft material. The main body has an axial surface, a suction surface, and a peripheral surface. The axial surface is provided for being pressed by a pressing member of the sucking disc. The suction surface is provided for sucking on a target object. The axial surface comprises a lifting portion and a pressure bearing block. The pressure bearing block is hard and circular shaped. The portion of the main body between the lifting portion and the pressure bearing block is defined as a deformable portion. The portion of the main body below the pressure bearing block is defined as an undeformable portion. The undeformable portion is located at the outer periphery of the main body. The deformable portion is located between the lifting portion and the undeformable portion. When the lifting portion is forced, the deformable portion is lifted and deformed, and the undeformable portion is fixed by the pressure baring block, so that the undeformable portion of the main body is firmly attached onto the target object.

In one embodiment, the pressure bearing block has a top surface, a bottom surface, an outer periphery surface, and an inner periphery surface. The top surface is respectively perpendicular to the outer periphery surface and the inner periphery surface. The bottom surface is respectively perpendicular to the outer periphery surface and the inner periphery surface. The width of the top surface is equal to the width of the bottom surface. The height of the outer periphery surface is equal to the height of the inner periphery surface. The width of the top surface is greater than the height of the outer periphery surface. The bottom surface is fixedly connected to the axial surface of the main body. The outer periphery surface is aligned with the peripheral surface. The inner periphery surface is spaced from the lifting portion by a distance.

In one embodiment, an annular groove is recessed from the axial surface of the main body. The depth of the annular groove is equal to the height of the outer periphery surface and the height of the inner periphery surface. The pressure bearing block is fixed in the annular groove. The top surface of the pressure bearing block is aligned with the axial surface of the main body.

In one embodiment, the bottom surface of the pressure bearing block is assembled with the axial surface of the main body by glues.

In one embodiment, the main body is made of rubber, and the pressure bearing block is made of metal. The main body is produced by injection molding. During the injection molding, the axial surface of the main body is fixedly connected to the bottom surface of the pressure bearing block, so that the main body and the pressure bearing block are integrated as a whole.

In one embodiment, the Shore hardness type A of the main body is less than 30 degrees.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
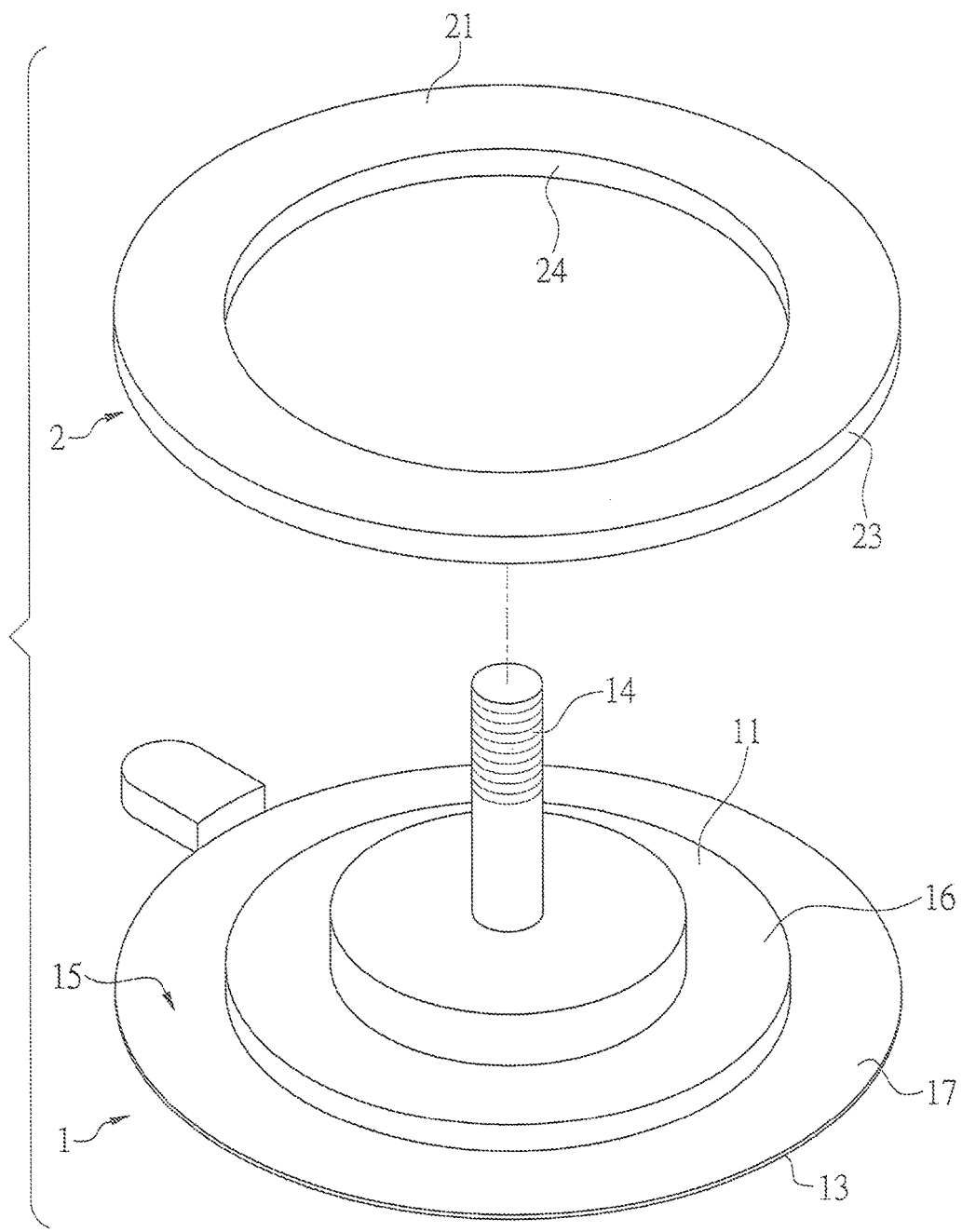
FIG. 1 illustrates a perspective view of an exemplary embodiment of the present invention.
Figure 2:
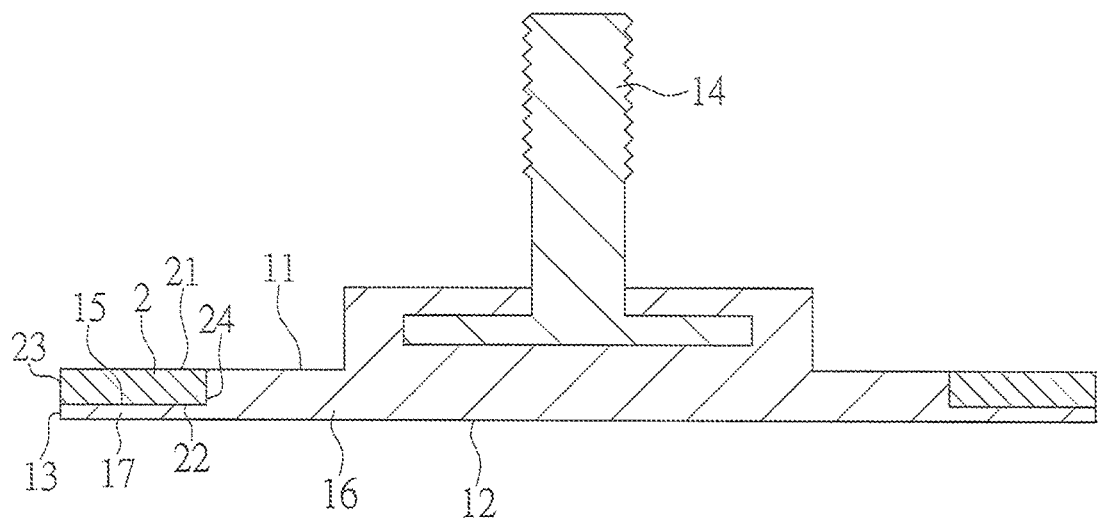
FIG. 2 illustrates a cross-sectional view of the exemplary embodiment of the present invention.

Please refer to FIGS. 1 and 2, a pad structure of a sucking disc of an exemplary embodiment of the present invention is provided. The pad structure comprises a main body 1 which is disc-shaped and made of soft material such as rubber. The main body 1 has an axial surface 11, a suction surface 12, and a peripheral surface 13. The axial surface 11 is provided for being pressed by a pressing member of the sucking disc. The suction surface 12 is provided for sucking on a wall. The axial surface 11 of the main body 1 comprises a lifting portion 14 and a pressure bearing block 2 which is circular shaped.

In this embodiment, the pressure bearing block 2 is made of metal and formed as a circular plate which has a uniform hardness. The pressure bearing block 2 has a top surface 21, a bottom surface 22, an outer periphery surface 23, and an inner periphery surface 24. The top surface 21 is respectively perpendicular to the outer periphery surface 23 and the inner periphery surface 24. The bottom surface 22 is respectively perpendicular to the outer periphery surface 23 and the inner periphery surface 24. The width of the top surface 21 is equal to the width of the bottom surface 22. The height of the outer periphery surface 23 is equal to the height of the inner periphery surface 24. The width of the top surface 21 is greater than the height of the outer periphery surface 23.

An annular groove 15 is recessed along the axial surface 11 of the main body 1. The depth of the annular groove 15 is equal to the height of the outer periphery surface 23 and the height of the inner periphery surface 24. The pressure bearing block 2 is in the annular groove 15, specifically, the bottom surface 22 of the pressure bearing block 1 is fixed in the annular groove 15. Accordingly, the top surface 21 of the pressure bearing block 2 is aligned with the axial surface 11 of the main body 1, the outer periphery surface 23 of the pressure bearing block 2 is aligned with the peripheral surface 13 of the main body 1, and the inner periphery surface 24 of the pressure bearing block 2 is spaced from the lifting portion 14 by a distance.

The pressure bearing block 2 may be glued with the main body 1. In this embodiment, the main body 1 is produced by injection molding, and the pressure bearing block 2 is assembled in the mold. Therefore, during the injection molding, the axial surface 11 of the main body 1 is fixedly connected to the bottom surface 22 of the pressure bearing block 2, so that the main body 1 and the pressure bearing block 2 are integrally as a whole.

Because the shape and the configuration of the pressure bearing block 2, the portion of the main body 1 between the lifting portion 14 and the inner periphery surface 24 of the pressure bearing block 2 is defined as a deformable portion 16, and the portion of the main body 1 below the pressure bearing block 2 is defined as an undeformable portion 17. The undeformable portion 17 is located at the outer periphery of the main body 1. The lifting portion 14 is located within the deformable portion 16.

Figure 3:
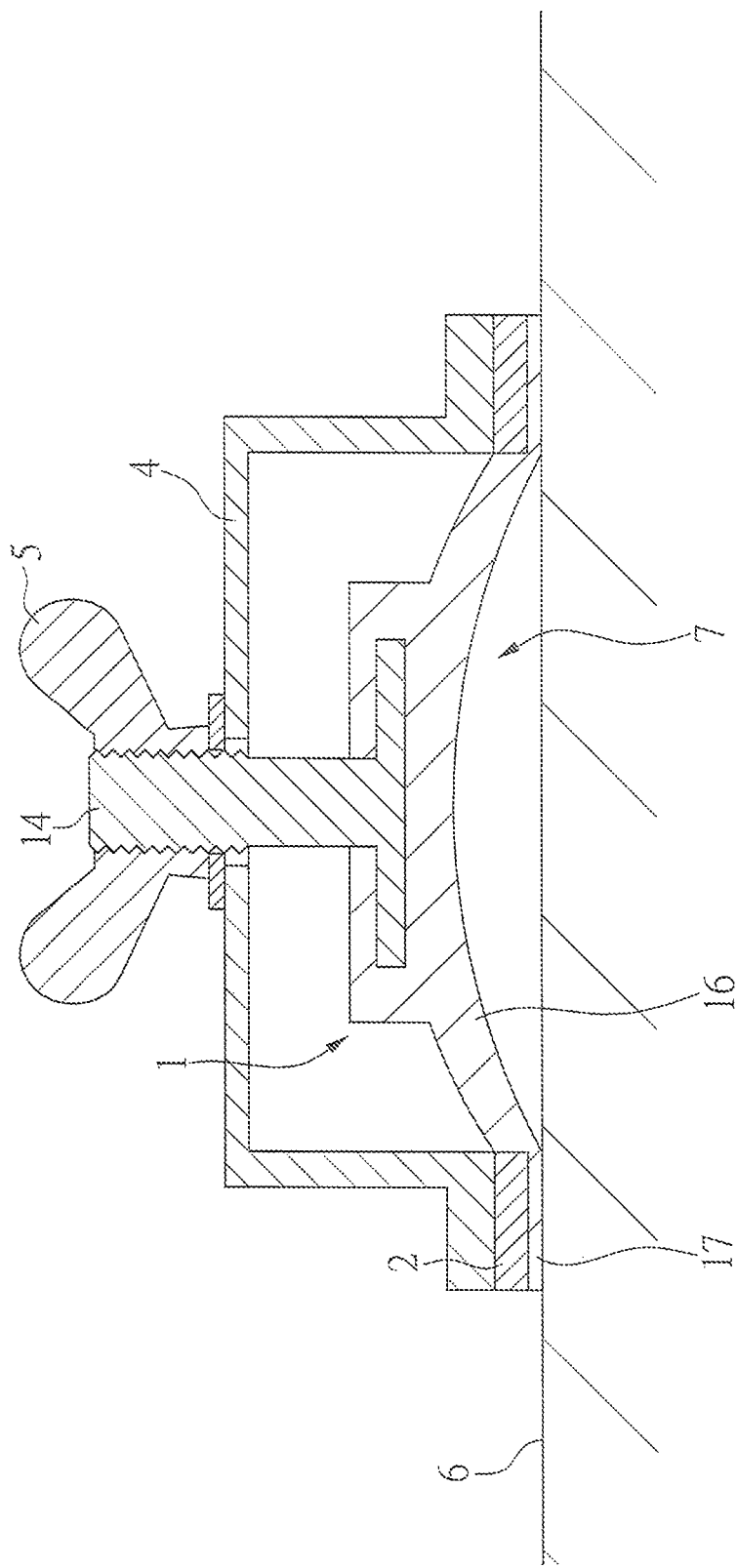
FIG. 3 illustrates a sectional operational view of the exemplary embodiment of the present invention used with a sucking disc.

The pad structure is provided to be used with a sucking disc, as shown in FIG. 3. The sucking disc has a pressing member 4 and a controlling member 5. The bottom of the pressing member 4 presses onto the pressure bearing block 2. The controlling member 5 is connected to the lifting portion 14 and capable of pulling the lifting portion 14 upward by a driving means. In operation, the main body 1 is attached onto a wall 6 and the controlling member 5 is controlled, so that the pressing member 4 presses the pressure bearing block 3 downward and the lifting portion 14 is lifted upward to cause the deformation of the deformable portion 16. Hence, a vacuum space 7 is formed, and the sucking disc performs suction.

During the aforementioned operation, it is understood that, the pressing member 4 presses onto the pressure bearing block 2, and the pressure bearing block 2 applies the pressing force of the pressing member 4 to the undeformable portion 17 of the main body 1. Because the pressure bearing block 2 is a hard and uniform plate, the pressure is the same over the whole pressure bearing block 2, and the pressure bearing block 2 can apply the pressing force to the undeformable portion 17 uniformly. Hence, the undeformable portion 17 can be completely attached onto the wall 6, so that the contact area between the pad structure and the wall 6 can increase. On the other hand, since the pressure bearing block 2 is hard and integrally formed with the undeformable portion 17, when the undeformable portion 17 is forced, the undeformable portion 17 is not deformed. Therefore, when the pressure bearing block 2 is pressed and the lifting portion 14 is lifted upward, the deformable portion 16 is deformed to form the vacuum space 7 and performs suction, while the undeformable portion 17 is not deformed to retain a sufficient contact area between the pad structure and the wall 6. Accordingly, a high airtightness of the pad structure can be maintained, so that the suction time of the sucking disc to be attached onto the wall 6 can be extended.

The improved airtight ability and extended suction time can be also provided when the main body 1 is made of a soft material whose Shore hardness type A is less than 30 degrees.

Figure 4:
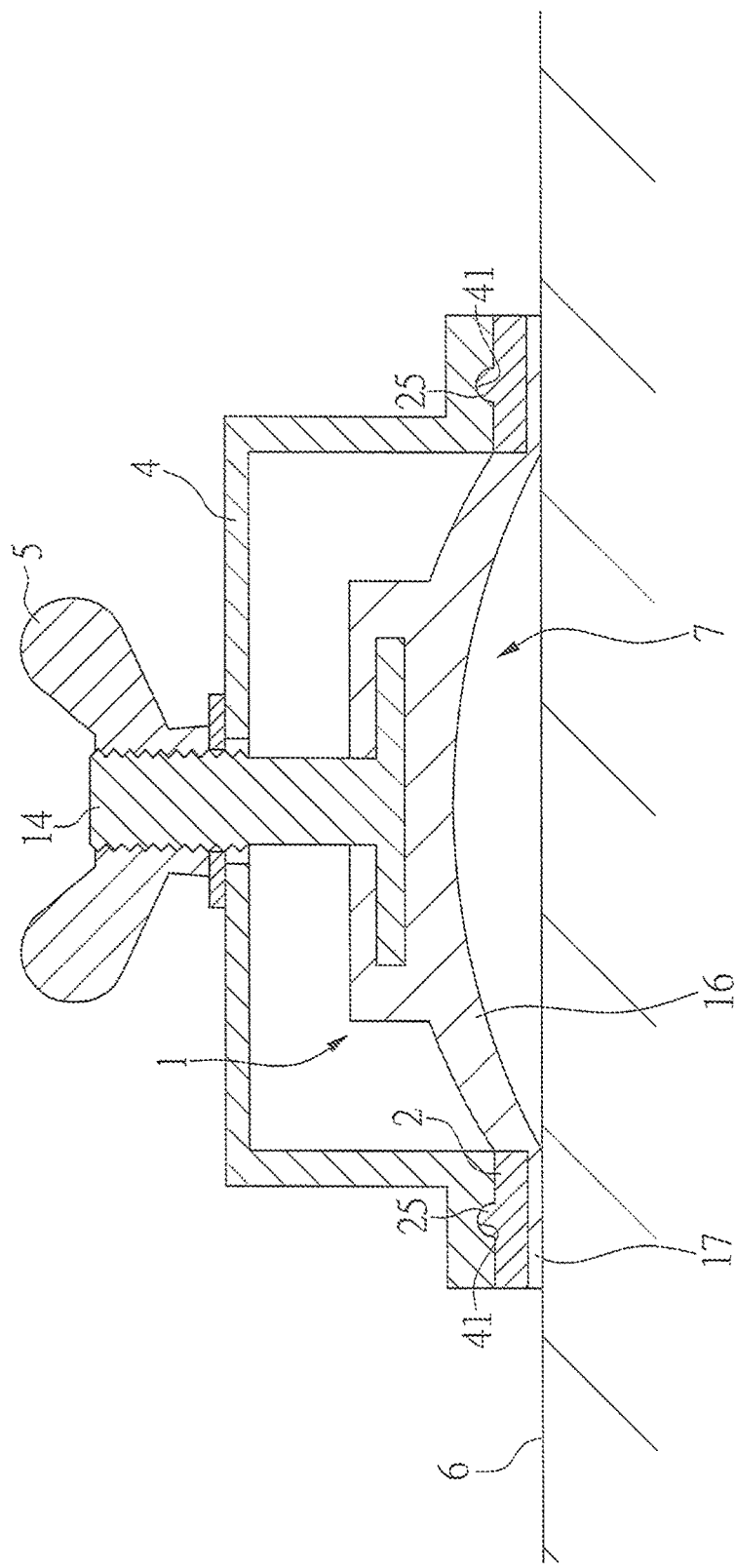
FIG. 4 illustrates a schematic view of a second embodiment of the present invention.

FIG. 4 illustrates a second embodiment of the present invention. In the second embodiment, the top surface 21 of the pressure bearing block 2 comprises at least one protruded portion 25, and the bottom surface of the pressing member 4 comprises a recess 41 to engage with the protruded portion 25.

Figure 5:
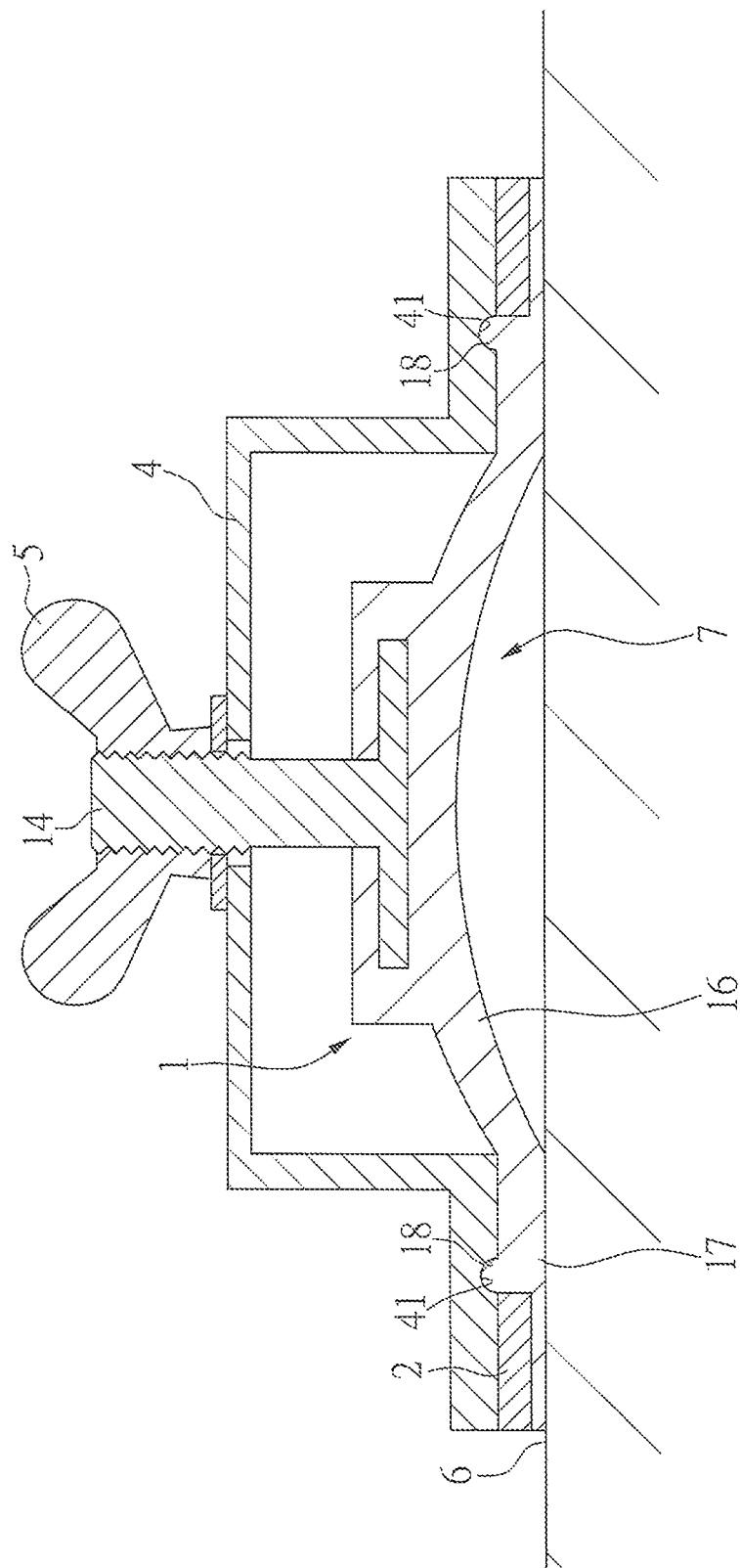
FIG. 5 illustrates a schematic view of a third embodiment of the present invention.
Figure 6:
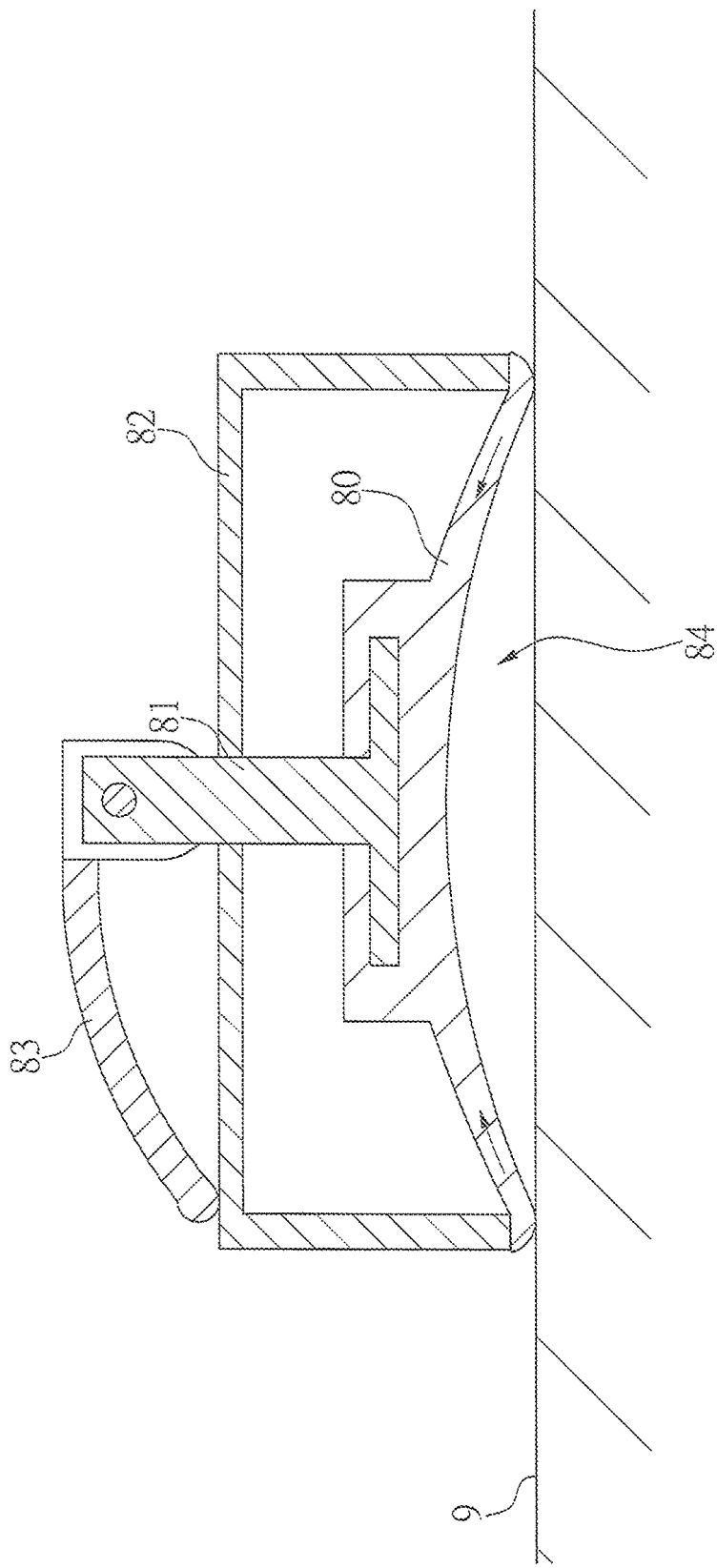
FIG. 6 illustrates a cross-sectional view of a conventional sucking disc.
Figure 7:
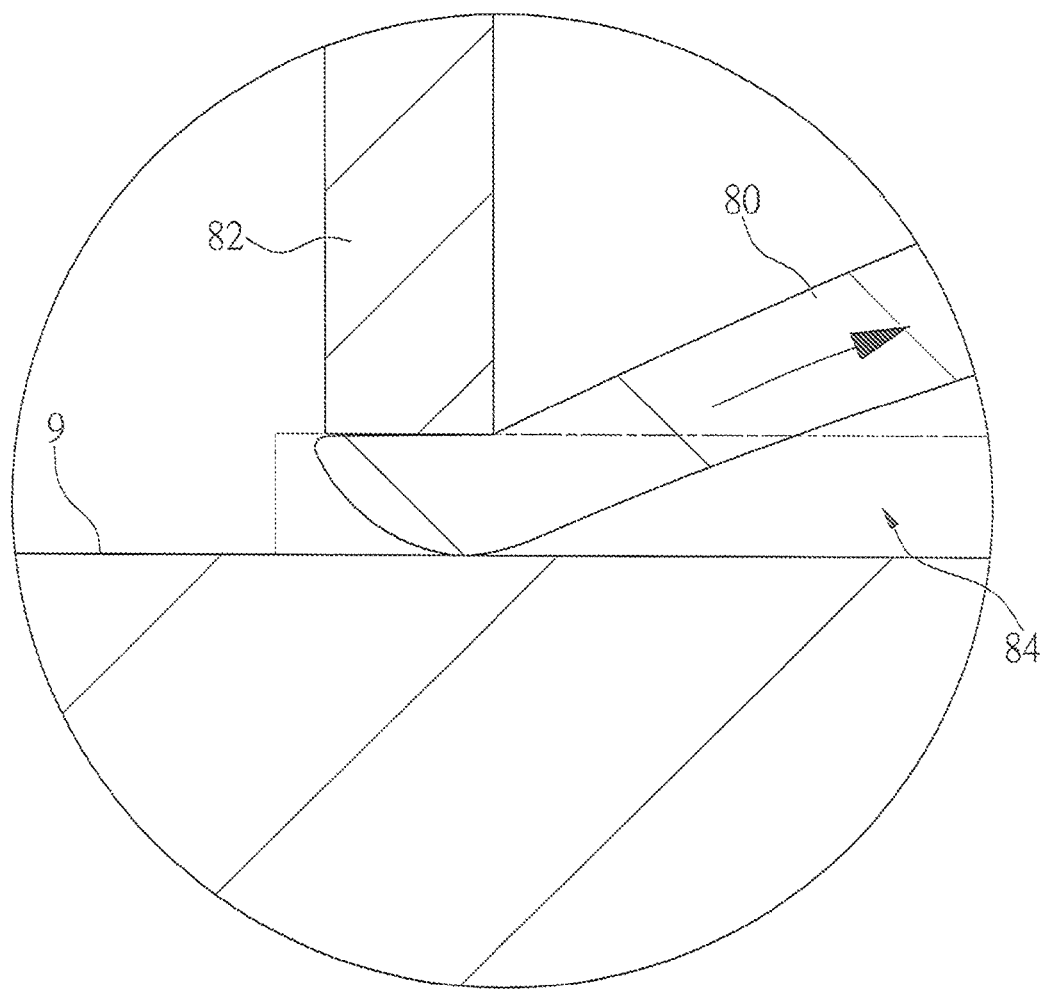
FIG. 7 illustrates an enlarged view of the portion A shown in FIG. 6.

FIG. 5 illustrates a third embodiment of the present invention. In the third embodiment, the axial surface 11 of the main body 1 comprises at least one protruded portion 18, and the bottom surface of the pressing member 4 comprises a recess 41 to engage with the protruded portion 18.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A pad structure of a sucking disc, comprising a main body made of soft material, wherein the main body has an axial surface, a suction surface, and a peripheral surface, the axial surface is provided for being pressed by a pressing member of the sucking disc, the suction surface is provided for sucking on a target object, wherein the axial surface comprises a lifting portion and a pressure bearing block which is hard and circular shaped, the portion of the main body between the lifting portion and the pressure bearing block is defined as a deformable portion, the portion of the main body below the pressure bearing block is defined as an undeformable portion, the undeformable portion is located at the outer periphery of the main body, the deformable portion is located between the lifting portion and the undeformable portion, wherein when the lifting portion is forced, the deformable portion is lifted and deformed, and the undeformable portion is fixed by the pressure bearing block, so that the undeformable portion of the main body is firmly attached onto the target object;

wherein the pressure bearing block has a top surface, a bottom surface, an outer periphery surface, and an inner periphery surface, the top surface is respectively perpendicular to the outer periphery surface and the inner periphery surface, the bottom surface is respectively perpendicular to the outer periphery surface and the inner periphery surface, the width of the top surface is equal to the width of the bottom surface, the height of the outer periphery surface is equal to the height of the inner periphery surface, the width of the top surface is greater than the height of the outer periphery surface, the bottom surface is fixedly connected to the axial surface of the main body, the outer periphery surface is aligned with the peripheral surface, the inner periphery surface is spaced from the lifting portion by a distance; and an annular groove is recessed from the axial surface of the main body, the depth of the annular groove is equal to the height of the outer periphery surface and the height of the inner periphery surface, the pressure bearing block is fixed in the annular groove, and the top surface of the pressure bearing block is aligned with the axial surface of the main body.

2. The pad structure of a sucking disc according to claim, 1, wherein the bottom surface of the pressure bearing block is assembled with the axial surface of the main body by glues.

3. The pad structure of a sucking disc according to claim 1, wherein the main body is made of rubber, and the pressure bearing block is made of metal.

4. The pad structure of a sucking disc according to claim 3, wherein the main body is produced by injection molding, and wherein during the injection molding, the axial surface of the main body is fixedly connected to the bottom surface of the pressure bearing block, so that the main body and the pressure bearing block are integrated as a whole.

5. The pad structure of a sucking disc according to claim 1, wherein the Shore hardness type A of the main body is less than 30 degrees.

6. The pad structure of a sucking disc according to claim 1, wherein the top surface of the pressure bearing block comprises at least one protruded portion.

7. The pad structure of a sucking disc according to claim 1, wherein the axial surface of the main body comprises at least one protruded portion.

* * * * *